US007500535B2

(12) United States Patent
Kamon et al.

(10) Patent No.: US 7,500,535 B2
(45) Date of Patent: Mar. 10, 2009

(54) CONTROL DEVICE FOR CONSTRUCTION MACHINE

(75) Inventors: Yoshiki Kamon, Hiroshima (JP); Yoshiyasu Umezu, Hiroshima (JP); Tomohiko Asakage, Hiroshima (JP); Norihiko Hayashi, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 251 days.

(21) Appl. No.: 10/543,341

(22) PCT Filed: Jan. 28, 2004

(86) PCT No.: PCT/JP2004/000773

§ 371 (c)(1), (2), (4) Date: Jul. 25, 2005

(87) PCT Pub. No.: WO2004/070181

PCT Pub. Date: Aug. 19, 2004

(65) Prior Publication Data

US 2006/0179830 A1 Aug. 17, 2006

(30) Foreign Application Priority Data

Feb. 7, 2003 (JP) ............................ 2003-031035

(51) Int. Cl.
*B60K 28/00* (2006.01)

(52) U.S. Cl. ....................... 180/272; 180/271; 180/286; 180/315; 180/321; 180/324; 180/336; 60/431; 60/420; 60/399; 60/394; 60/368

(58) Field of Classification Search ................. 180/286, 180/272, 271, 315, 321, 324, 336; 60/431, 60/420, 399, 394, 368
See application file for complete search history.

(56) References Cited

U.S. PATENT DOCUMENTS

| | | | | | |
|---|---|---|---|---|---|
| 4,286,683 | A | * | 9/1981 | Zeigner et al. | 180/54.1 |
| 4,372,414 | A | * | 2/1983 | Anderson et al. | 180/165 |
| 4,381,042 | A | * | 4/1983 | Perry | 180/272 |
| 5,219,413 | A | * | 6/1993 | Lineberger | 180/272 |
| 5,251,440 | A | * | 10/1993 | Bong-dong et al. | 60/329 |
| 5,547,039 | A | * | 8/1996 | Berger et al. | 180/287 |
| 5,990,800 | A | * | 11/1999 | Tamaki et al. | 340/679 |

(Continued)

FOREIGN PATENT DOCUMENTS

JP 1-63774 4/1989

(Continued)

*Primary Examiner*—John Q Nguyen
*Assistant Examiner*—Karen Amores
(74) *Attorney, Agent, or Firm*—Oblon, Spivak, McClelland, Maier & Neustadt, P.C.

(57) ABSTRACT

A control device for a construction machine according to the present invention is configured so that in the construction machine provided with an automatic stop function which automatically stops an engine by an engine controller upon a predetermined automatic stop condition being met, and a hydraulic lock function which sets a hydraulic actuator locked in an inactive state by a hydraulic lock controller, there is provided a restart switch, where after an automatic stop of the engine, when the restart switch is operated, a restart command is transmitted to the engine controller via a route independently of that of an engine switch and independently of a hydraulic unlock condition, and the engine is restarted.

7 Claims, 11 Drawing Sheets

U.S. PATENT DOCUMENTS

| | | | | |
|---|---|---|---|---|
| 6,030,169 | A * | 2/2000 | Rossow et al. | 414/680 |
| 6,202,014 | B1 * | 3/2001 | Brandt et al. | 701/50 |
| 6,358,180 | B1 * | 3/2002 | Kuroda et al. | 477/4 |
| 6,577,909 | B1 * | 6/2003 | McGowan et al. | 700/79 |
| 6,766,869 | B2 * | 7/2004 | Brand et al. | 175/24 |
| 6,912,803 | B2 * | 7/2005 | Ichimura | 37/348 |
| 6,923,285 | B1 * | 8/2005 | Rossow et al. | 180/272 |
| 7,032,377 | B1 * | 4/2006 | Keller et al. | 60/399 |
| 7,091,629 | B2 * | 8/2006 | Hawkins | 307/10.6 |
| 7,269,490 | B2 * | 9/2007 | Matsuda | 701/50 |
| 2002/0056585 | A1 * | 5/2002 | Jones et al. | 180/286 |
| 2002/0195275 | A1 * | 12/2002 | Brand et al. | 175/24 |
| 2004/0226768 | A1 * | 11/2004 | DeLuca et al. | 180/275 |
| 2005/0183415 | A1 * | 8/2005 | Shimakura | 60/431 |
| 2006/0137643 | A1 * | 6/2006 | Thompson et al. | 123/179.4 |
| 2006/0179830 | A1 * | 8/2006 | Kamon et al. | 60/431 |
| 2006/0200292 | A1 * | 9/2006 | Asakage | 701/50 |
| 2006/0212211 | A1 * | 9/2006 | Kamon et al. | 701/112 |
| 2007/0016353 | A1 * | 1/2007 | Bredin | 701/70 |
| 2007/0056793 | A1 * | 3/2007 | Yanagihara et al. | 180/336 |
| 2007/0101708 | A1 * | 5/2007 | Ohigashi et al. | 60/431 |

FOREIGN PATENT DOCUMENTS

| | | |
|---|---|---|
| JP | 2003-65097 | 3/2003 |
| JP | 2004-116347 | 4/2004 |

* cited by examiner

CONTROL DEVICE FOR CONSTRUCTION MACHINE

TECHNICAL FIELD

The present invention relates to a control device for a construction machine adapted to automatically stop an engine upon no operation being carried out.

BACKGROUND ART

Japanese Patent Laid-Open Nos. 2000-96627 and 2001-41069 disclose conventional construction machines provided with an automatic stop function which automatically stops an engine upon there being met a predetermined automatic stop condition (such as a condition that a gate lever used to open/close a gateway of a cabin is opened, and a lever adapted to operate a work actuator is not being operated).

There is a publicly known technique which sets a hydraulic actuator of a machine to be locked in an inactive state upon a non-working condition being detected.

Moreover, as a method to restart an engine after an automatic stop of the engine, there are generally taken measures to once return an engine switch (key switch) to an "OFF" position from an "ON" position upon the automatic stop, and to then operate from the "ON" position to an engine start position as in a usual start method.

In this method, the restart operation is troublesome, and work efficiency is low in a case where the engine automatic stop is carried out frequently such as a case where an operator frequently gets in/out.

As measures against this problem, above Japanese Patent Laid-Open No. 2001-41069 describes a technique which restarts the engine upon the gate lever being closed, which is also a condition to release a hydraulic lock control.

In this case, if the operator touches an operating member (operating lever) adapted for the actuator by mistake upon getting into the machine, for example, there may occur an undesirable incident such as activation of the actuator against the intention of the operator.

In this way, there have conventionally been the problems of difficulty of simultaneously realizing the simplicity and reliability of the restart after the engine automatic stop.

DISCLOSURE OF THE INVENTION

It is an object of the present invention to provide a control device for a construction machine which can eliminate a burden on the restart operation, and can secure a reliable restart at the same time.

The present invention employs the following configurations in order to solve the aforementioned problems.

The present invention provides a control device for a construction machine including an engine as a power source adapted to be started/stopped based upon an operation applied to an engine switch, a hydraulic actuator for operating upon a hydraulic pump as a driving source, hydraulic lock control means for setting the hydraulic actuator locked in an inactive state upon a predetermined hydraulic lock condition being met and setting the hydraulic actuator unlocked upon a predetermined hydraulic unlock condition being met, engine control means for carrying out an automatic stop control to automatically stop the engine upon a predetermined automatic stop condition being met, and restart instructing means for issuing a restart command to the engine control means via a route independently of that of the engine switch and independently of the hydraulic unlock condition, where the engine control means is configured to restart the engine based upon the restart command from the restart instructing means after an automatic stop of the engine by the automatic stop control.

Moreover, according to the present invention, the above configuration includes an operating member for instructing activation of the hydraulic actuator, and there is provided a restart sensor as the restart instructing means for transmitting the restart command to the engine control means upon detecting an intention of an operator to operate the operating member.

BEST MODE FOR CARRYING OUT THE INVENTION

Figure 1:
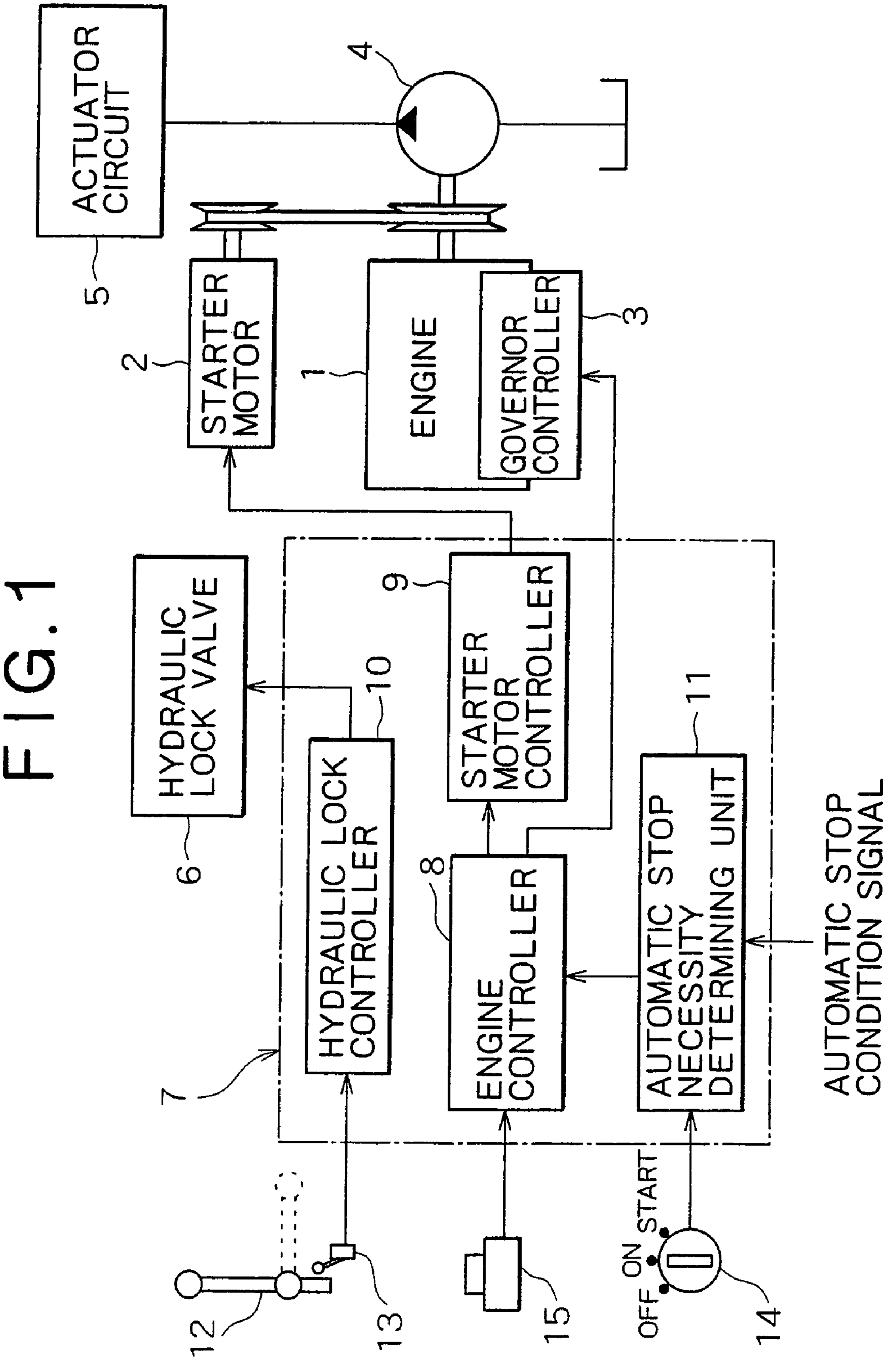
FIG. 1 is a block configuration diagram showing a first embodiment of the present invention.
Figure 2:
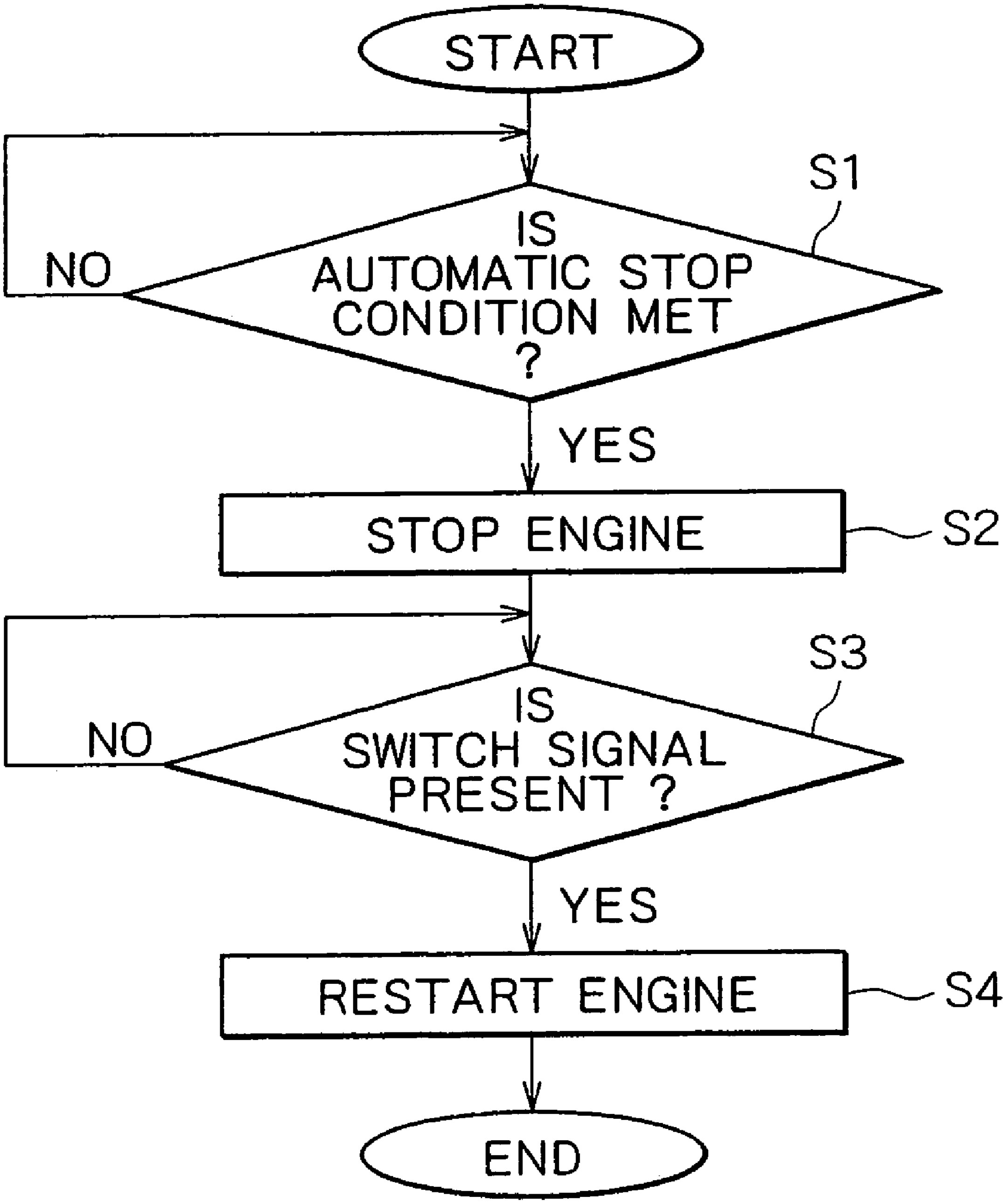
FIG. 2 is a flowchart describing an operation of the first embodiment.

First Embodiment (Refer to FIGS. 1 and 2)

An engine 1 serving as a power source in FIG. 1 is started by a starter motor 2, and a rotational speed/stop thereof are controlled by a governor controller 3.

Reference numeral 4 denotes a hydraulic pump rotationally driven by the engine 1, and pressure oil discharged from the hydraulic pump 4 is delivered to an actuator circuit 5. A hydraulic actuator is driven via a hydraulic pilot type control valve whose switching is controlled by an operating lever (not shown) serving as an operating member.

A hydraulic lock valve 6 is provided on a hydraulic pressure pilot line for delivering a pilot pressure to the control valve, and hydraulic lock is activated upon the hydraulic lock valve 6 being closed, thereby inactivating the operation of the control valve, namely the operation of the actuator. Note that there may be provided such a configuration that the activation of the hydraulic lock valve 6 opens the pilot line to a tank, thereby activating the hydraulic lock, namely being in a hydraulic lock active condition.

A controller 7 for controlling the operation (including a restart and an automatic stop) of the engine 1 and the hydraulic lock is provided with an engine controller 8 serving as engine control means, a starter motor controller 9 for controlling an operation of the starter motor 2, a hydraulic lock controller (hydraulic lock control means) 10 for controlling the operation of the hydraulic lock valve 6, and an automatic stop necessity determining unit 11.

The automatic stop necessity determining unit 11 is supplied with a signal relating to a predetermined automatic stop condition, and determines whether to carry out the automatic stop control based upon the automatic stop condition signal.

Note that an example of the automatic stop condition may be either or both of the following states are detected by detectors such as a switch:

1) A gate lever 12 adapted to open/close a gateway of a cabin is opened as shown by solid lines in FIG. 1 (open state of the gateway where an operator can get on the cabin), and 2) The operating lever serving as operation means is not operated or not being operated continuously for a certain period.

If the automatic stop condition is met, the automatic stop necessity determining unit 11 determines to carry out the automatic stop control, and transmits a signal to instruct a start of the automatic stop control to the engine controller 8. According to this signal, the engine controller 8 carries out the automatic stop control of the engine 1.

Note that as the condition 1), upon a machine of a canopy structure without a cabin being provided with alternative means for the gate lever, an operation of the alternative means is recognized as the condition 1). For example, if there is provided such a configuration that an operating lever box provided with the operating lever is liftable and lowerable, and is lowered upon the operator being seated, the condition will be that the operating lever box is moved up (open). In FIG. 1, reference numeral 13 denotes a limit switch which is turned on if the gate lever 12 is opened.

Moreover, the hydraulic lock controller 10 controls the operation of the hydraulic lock valve 6 so as to activate the hydraulic lock upon the gate lever 12 being opened (locked state), and to release the hydraulic lock upon the gate lever 12 being closed (unlocked state) as described above based upon a signal from the limit switch 13.

On the other hand, there are provided an engine switch (key switch) 14 as means for outputting a command signal for the engine start (including a restart after the automatic stop), and a manual restart switch 15 (such as a push button switch) as restart instructing means.

The engine switch 14 has an "OFF" position to turn off an electric power and to stop the engine 1, an "ON" position to turn on the electric power, and a "START" position to start the engine 1 as known well. If the engine switch 14 is operated to the "START" position, an engine start command signal is transmitted to the starter motor controller 9 via the automatic stop necessity determining unit 11 and the engine controller 8, and the engine 1 is thus started unconditionally.

On the other hand, if the restart switch 15 is operated to be turned on, an operation signal thereof is transmitted as a restart command signal to the engine controller 8, and the engine start command signal is transmitted from the engine controller 8 to the starter motor controller 9 upon an engine automatic stop state being present, and the engine 1 is consequently started.

A description will now be given of the above operation using a flowchart in FIG. 2. As the control is started, it is determined whether the automatic stop condition is met or not (Step S1), the processing flow does not advance to a next step upon "NO", and the engine 1 is automatically stopped in Step S2 upon "YES".

After the engine stop, it is determined whether there is present a switch signal output upon the restart switch 15 being operated to be turned on in Step S3, and the engine 1 restarts in Step S4 upon "YES".

In this way, the restart after the engine automatic stop is carried out based upon the operation applied to the restart switch 15 independently of a hydraulic unlock.

Namely, since the restart of the engine 1 and the hydraulic unlock are carried out based upon the completely different conditions, they are not carried out at the same time, thereby preventing an incident where the hydraulic actuator is activated simultaneously with the restart of the engine 1, which is a case of background art, resulting in an increase of reliability of the restart.

Moreover, the restart switch 15 transmits the restart command to the engine controller 8 via a route independent of that of the engine switch 14 as independent means, and the restart operation thus can be carried out only by means of the restart switch 15.

In this case, there is provided the engine restart switch 15 for transmitting the restart command signal instructing the restart of the engine 1 to the engine controller 8 independently of the operation of the engine switch 14 and the control by the hydraulic lock controller 10, and the engine controller 8 is thus configured to restart the engine 1 based upon the restart command from the restart switch 15 after the automatic stop of the engine 1 by the automatic stop control.

Moreover, it is only necessary for the restart switch 15 to output the restart command for the engine 1, and it is thus not required to go through multiple steps (returning once to the "OFF" position from the "ON" position upon the engine automatic stop, and turning again to the "ON" position, and then to the "START" position), which are required for the engine switch 14 adapted to turn on/off the electric power.

A troublesome operation is thus not necessary, and the engine 1 can be restarted simply and quickly.

Moreover, since the manual restart switch 15 is used as the restart instructing means, the cost can be low.

Note that the restart switch 15 may be provided as a push button switch on a console or on a grip of the operating lever within the cabin, or may be provided as a foot switch on a floor within the cabin. Moreover, the switch 15 may be configured as a switch also used as another switch (such as a deceleration switch used to decelerate the engine rotational speed, or a horn switch).

Figure 3:
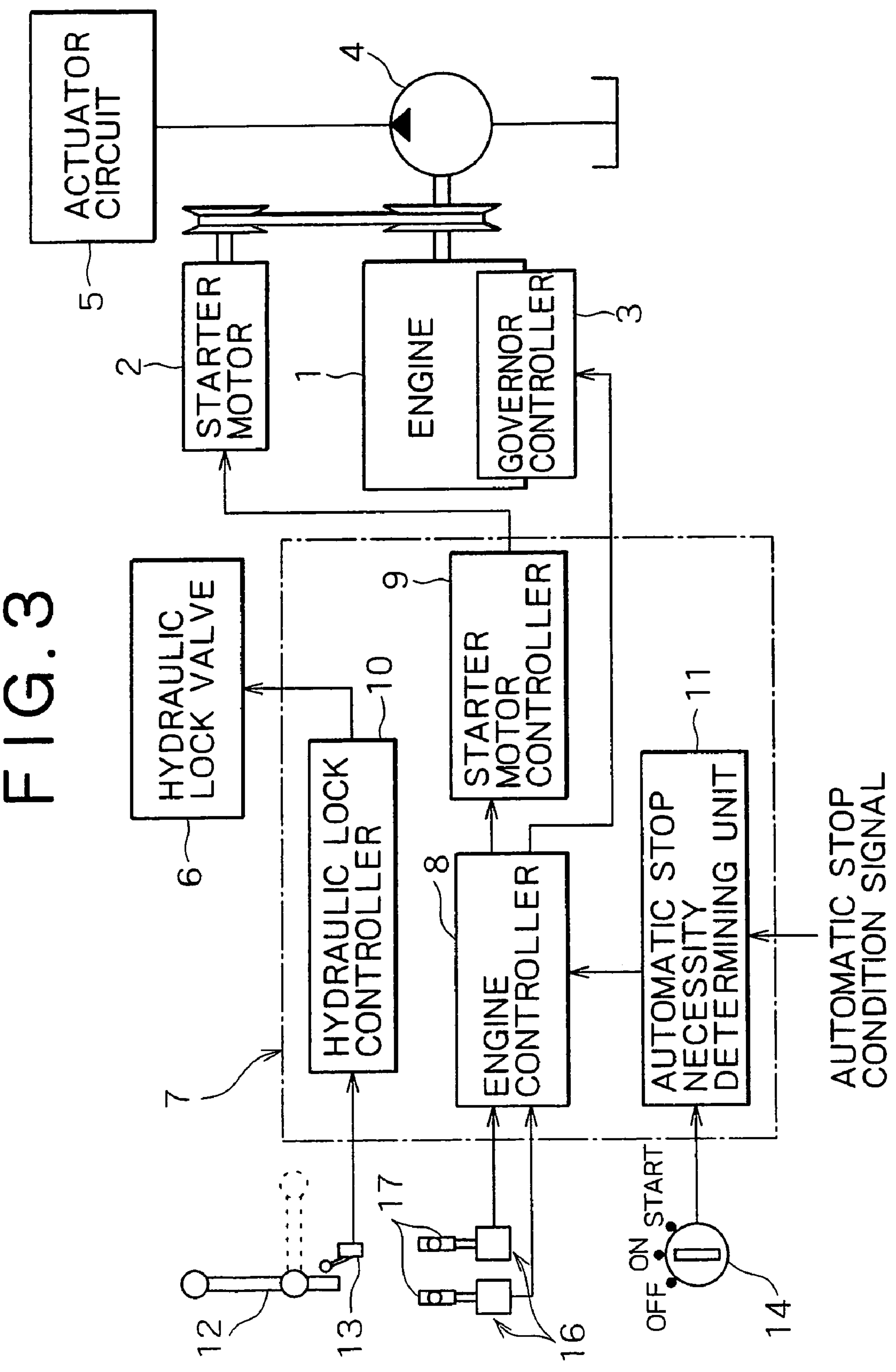
FIG. 3 is a block configuration diagram showing a second embodiment of the present invention.
Figure 4:
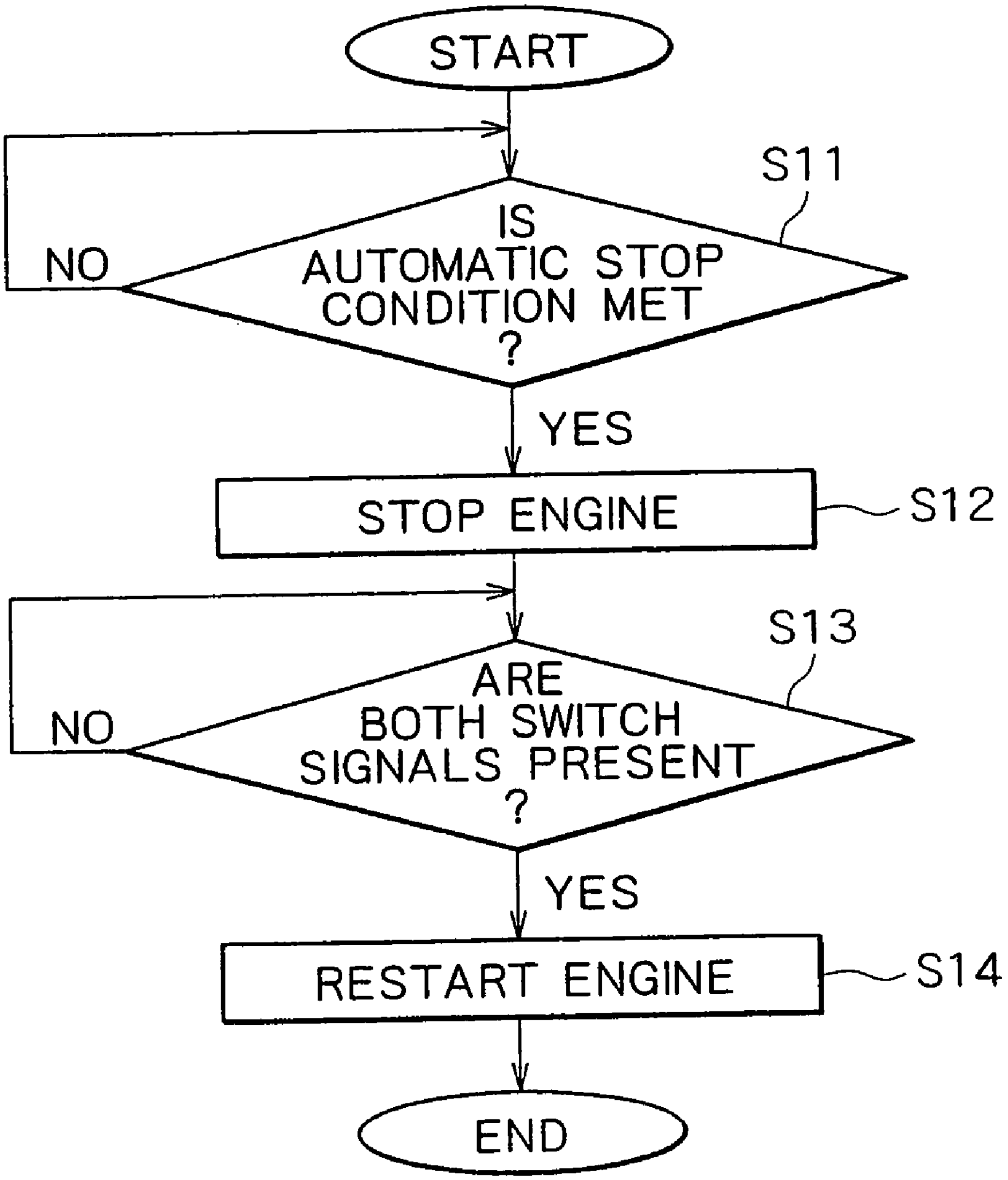
FIG. 4 is a flowchart describing an operation of the second embodiment.

Second Embodiment (Refer to FIGS. 3 and 4)

In the following embodiment, the same components are denoted by the same numerals as of the first embodiment (FIG. 1), and will not be further explained.

According to the second embodiment, as shown in FIG. 3, on multiple operating levers 16 (two in an example shown in FIG. 3. A description will be given of this example) for controlling operations of multiple hydraulic actuators are installed proximity switches 17 as the restart instructing means for detecting an intention of the operator in the operation to issue the restart command. There is provided such a configuration that the engine 1 is restarted based upon signals output simultaneously from both the proximity switches 17 when the operator grips both the operating levers 16 at the same time.

A detailed description will now be given of the above operation with reference to FIG. 4. After the engine 1 is automatically stopped in Step S12 upon the automatic stop condition being met ("YES" in Step S11), it is determined whether the signals are supplied from both the proximity switches 17 at the same time in Step S13, and the engine 1 is restarted upon "YES".

With this configuration, the operator approaches either of the operating levers 16 (grips and operates the operating lever 16) upon a start of a work, and the proximity switch 17 thus detects the intention of the operator to operate the operating lever 16 to restart the engine 1. The restart can be carried out more easily by the comfortable and natural operation for the operator.

Moreover, since it is required for the restart that the signals are output from the multiple operating levers 16 (proximity switches 17) at the same time, there is no fear for issuance of the restart command even if the operator touches the operating lever 16 by mistake or an insect or other foreign object touches the operating lever 16, which may occur upon the restart being instructed by the signal from only the single operating lever 16. Although the signals are output at the same time from both the switches 17 upon both the operating levers 16 being gripped simultaneously in the present embodiment, a permissible range (permissible interval in time) is properly allowed for the concept of "simultaneously".

However, there may be provided such a configuration that the engine 1 is restarted by the signal only from the single operating lever 16 (proximity switch 17) in the present invention.

Figure 5:
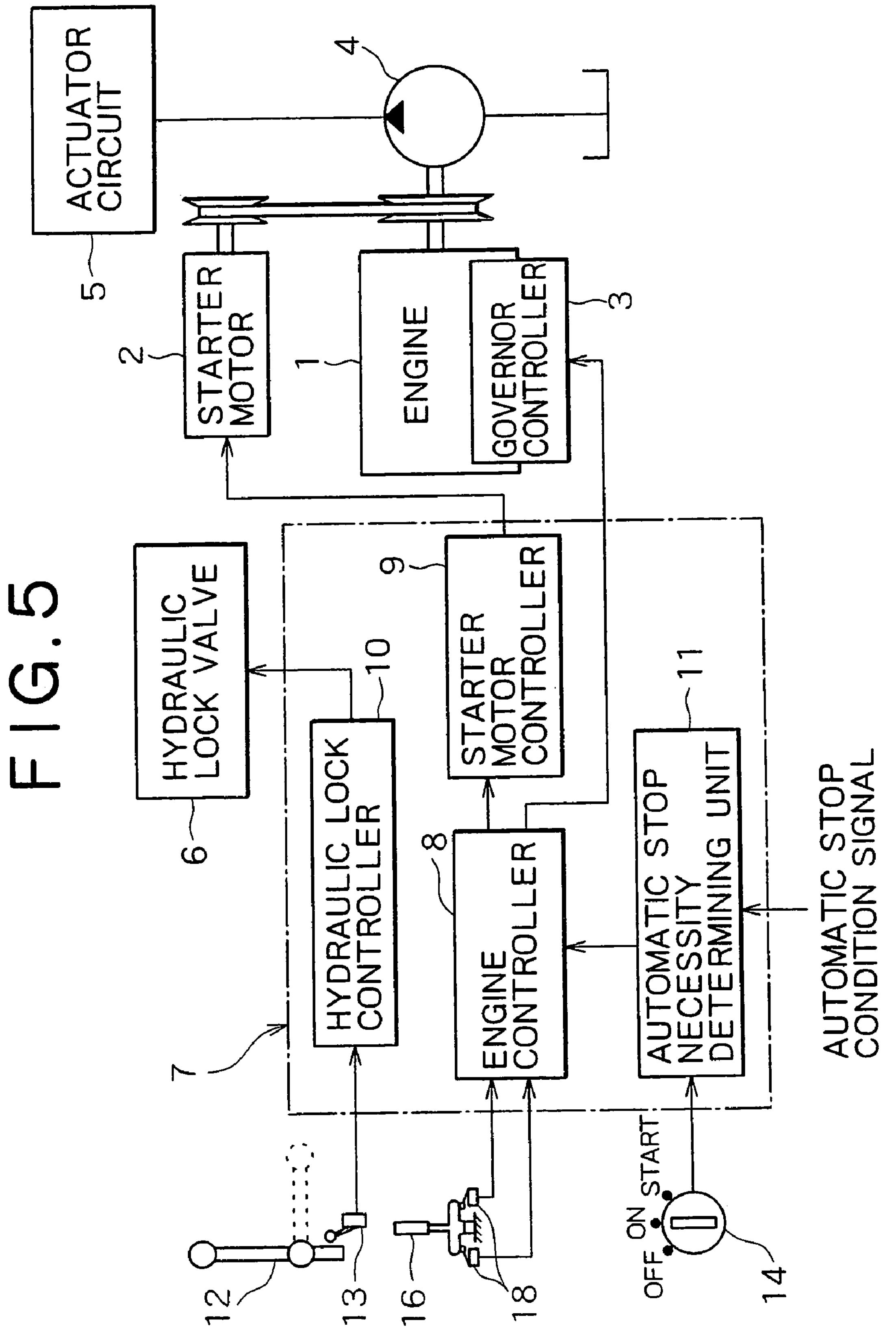
FIG. 5 is a block configuration diagram showing a third embodiment of the present invention.
Figure 6:
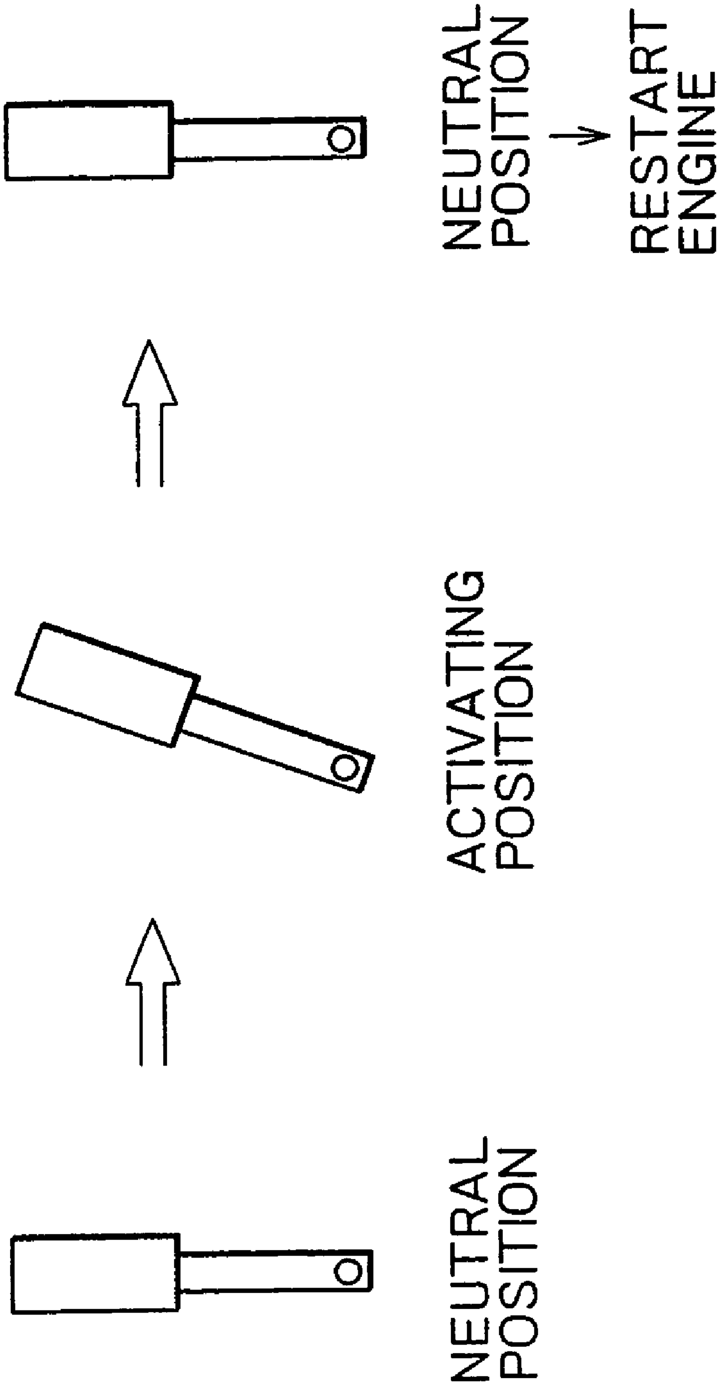
FIG. 6 is a diagram showing lever operation states used as a condition for an engine restart according to the third embodiment.
Figure 7:
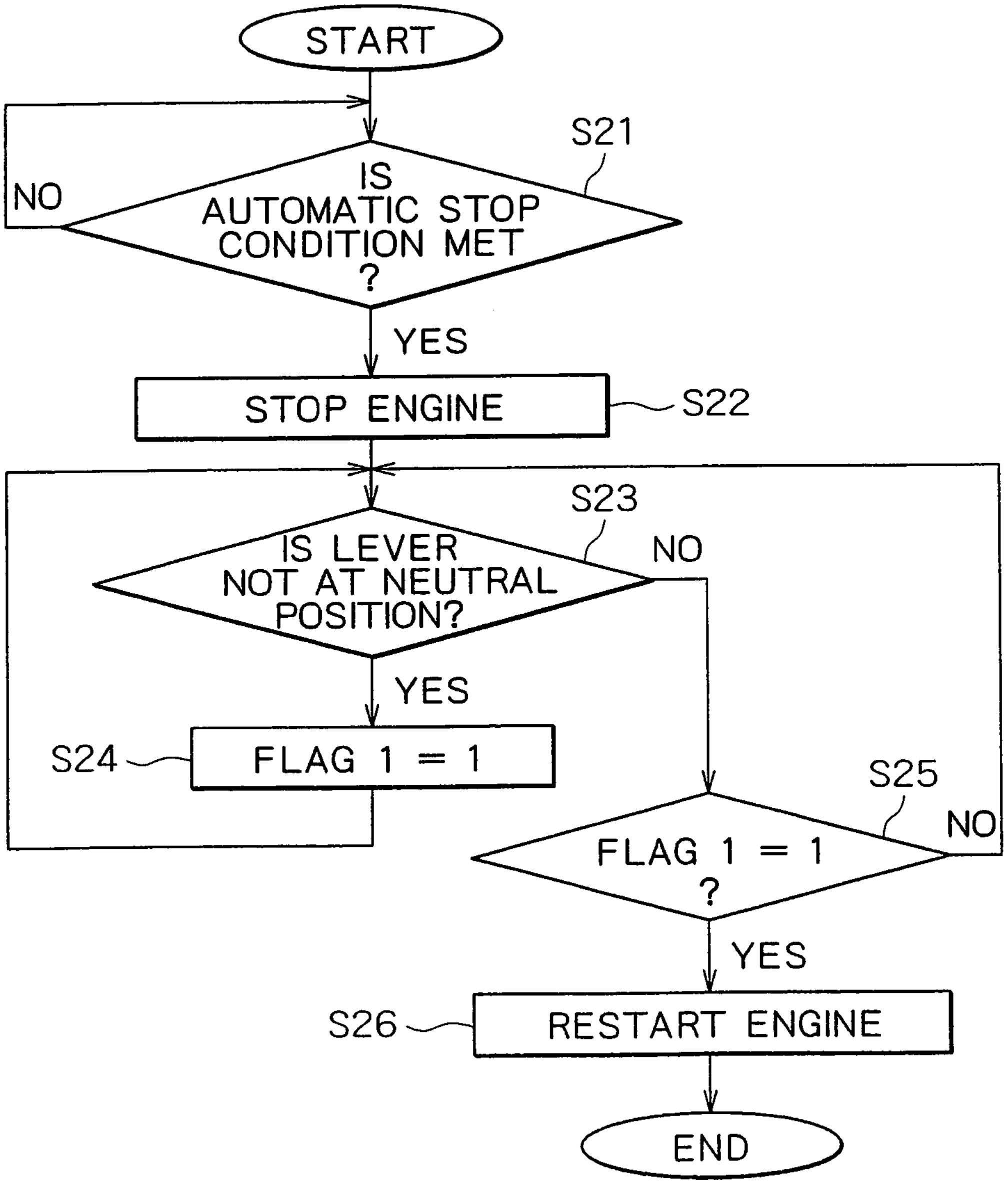
FIG. 7 is a flowchart describing an operation of the third embodiment.

Third Embodiment (Refer to FIGS. 5 to 7)

In a third embodiment, there is provided such a configuration that, upon the operating lever 16 being operated in a predetermined pattern, a restart command is issued.

Namely, as shown in FIG. 5, there are provided switches (such as limit switches) 18 which is turned on upon the operating lever 16 being operated to activating positions on the both sides. As shown in FIG. 6, there is provided such a configuration that the engine restart control is carried out when the operating lever 16 is operated from a neutral position to the activating position, and the returns again to the neutral position (the switch 18 on one side is turned off to on, and then is turned off again).

A description will now be given with reference to FIG. 7. After the engine 1 is automatically stopped in Step S22 upon the automatic stop condition being met ("YES" in Step S21), it is determined whether the lever is at the neutral position based upon the signals from both the switches 18 in Step 23, and a flag1 is set to 1 in Step S24 upon "YES" (lever is not at the neutral=lever is operated once).

On the other hand, upon "NO" in Step S23 (lever is neutral), it is determined whether the flag1=1 (ever has been operated) in Step S25. The engine controller 8 outputs the restart command assuming that the lever operation has been carried out in the specified pattern upon "YES", and the engine 1 is restarted.

In this way, since the restart command is not issued unless the operating lever 16 is operated in the predetermine engine start pattern (neutral position, activating position, neutral position in order), the intention of the operator to restart becomes clearer. Moreover, since it is necessary to carry out the operation in two steps where the operating lever 16 is operated from the neutral position, and then is returned to the neutral position, the possibility of an operation error decreases accordingly.

Note that as a variation of the third embodiment and the following fourth embodiment, a simultaneous operation of multiple operating levers may be added as a requirement for the engine restart as in the second embodiment.

Fourth Embodiment (Refer to FIGS. 8 to 11)

Figure 9:
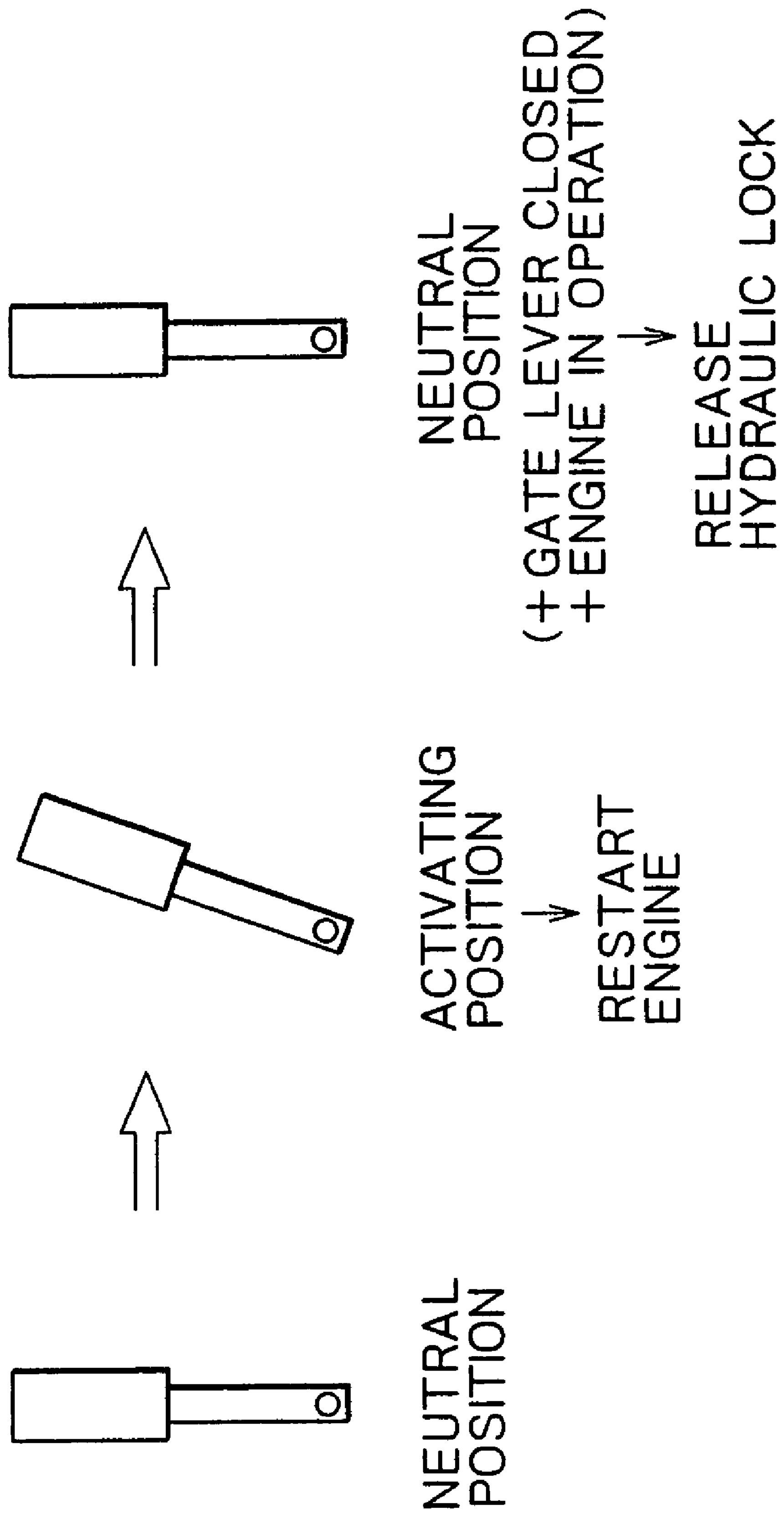
FIG. 9 is a diagram showing lever operation states used as a condition for an engine restart according to the fourth embodiment.

In the fourth embodiment, there is provided such a configuration that engine 1 is restarted upon the operating lever 16 being operated from the neutral position to the activating position as shown in FIG. 9, and then, upon the operating lever 16 returning to the neutral, the hydraulic lock is released if:

1) the gate lever is closed, and 2) the engine is in operation.

Figure 8:
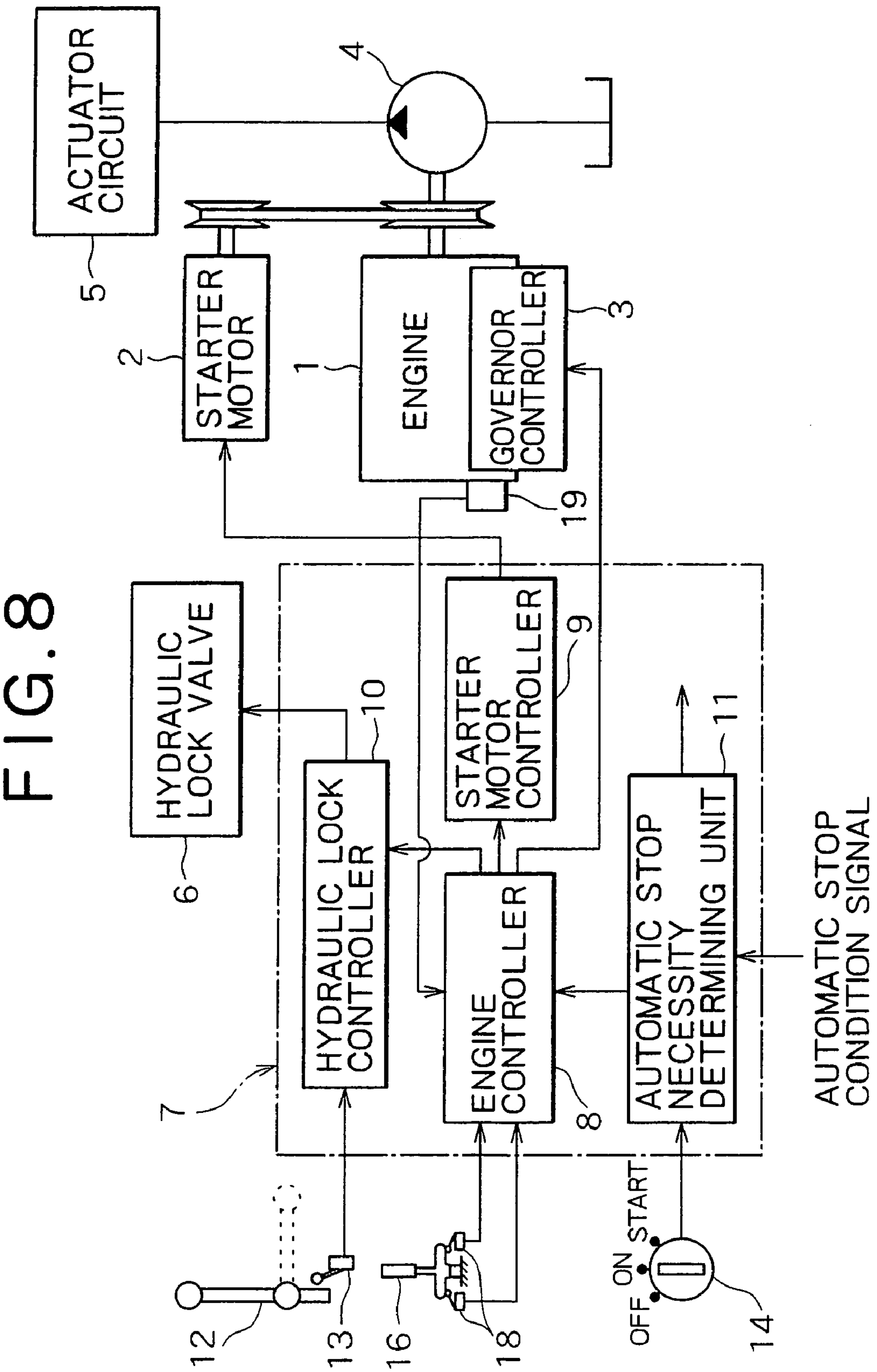
FIG. 8 is a block configuration diagram showing a fourth embodiment of the present invention.

Namely, as shown in FIG. 8, there is provided a rotational speed sensor 19 for detecting whether the engine 1 is turning (in operation) or not as engine operation detecting means, and a signal from the sensor 19 is transmitted to the engine controller 8.

Figure 10:
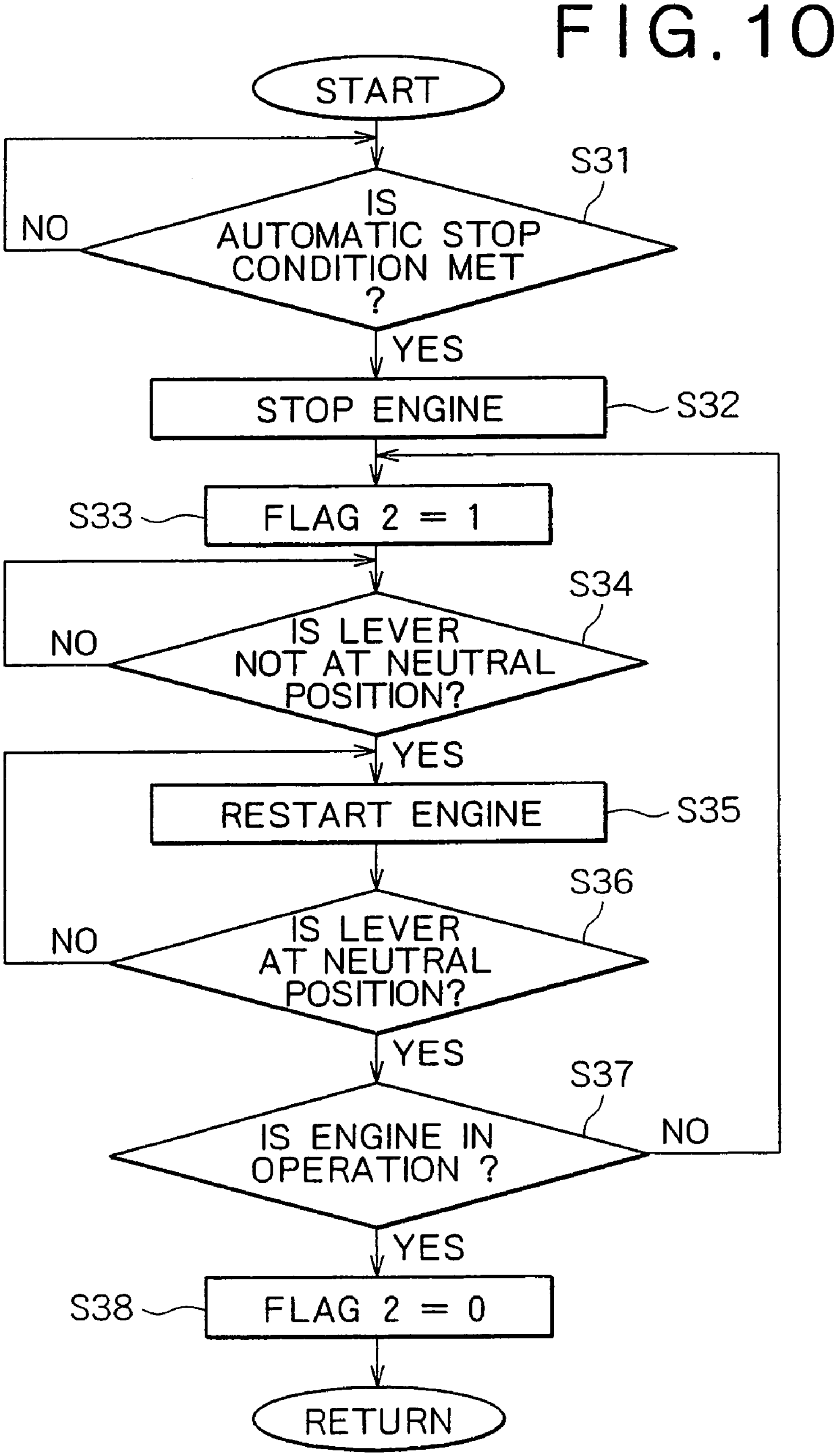
FIG. 10 is a flowchart describing contents of an engine restart control according to the fourth embodiment.
Figure 11:
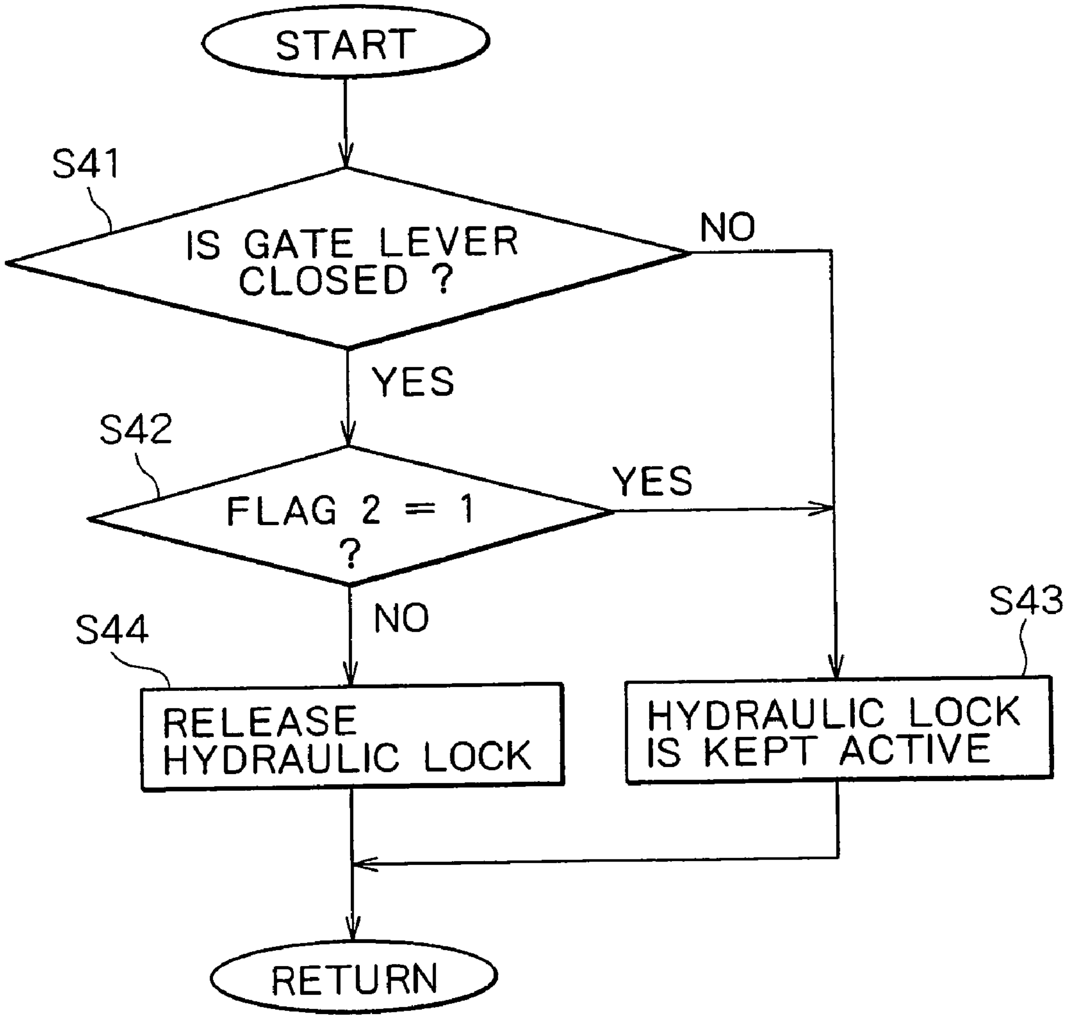
FIG. 11 is a flowchart describing contents of a hydraulic unlock control according to the fourth embodiment.

In addition, a signal indicative of the engine operation is transmitted from the engine controller 8 to the hydraulic lock controller 10, and the engine controller 8 and the hydraulic lock controller 10 carry out a control shown in FIGS. 10 and 11 based upon the signal.

FIG. 10 shows contents of the control by the engine controller 8, and if the engine 1 automatically stops in Step S32 upon the automatic stop condition being met ("YES" in Step S31), a flag2 is set to 1 in Step S33.

It is then determined whether the operating lever 16 is not neutral in Step S34, and the engine 1 restarts in Step S35 upon "YES" (not neutral=lever has been operated)

Then in the following Step S36, it is determined whether the operating lever 16 is returned to the neutral position or not, and if the operating lever 16 has been returned to the neutral position ("YES"), it is determined whether the engine is in operation or not in Step S37, and the flag2 is set to 0 if the engine is in operation (YES) (Step S38).

FIG. 11 shows contents of the control by the hydraulic lock controller 10, it is respectively determined whether the gate lever 12 is closed or not in Step S41, and whether the flag2=1 or not (engine is in operation or not) in Step S42. The hydraulic lock is maintained active upon the gate lever being opened and the engine being not in operation (Step S43).

On the other hand, only if the gate lever 12 is closed ("YES" in Step S41), and the engine is in operation ("NO" in Step S42), the hydraulic lock is released in Step S44.

With this configuration, compared with the third embodiment, since the lever operation required for the restart is only the one step of the operation from the neutral position to the activating position, the engine 1 is restarted quickly.

Moreover, although there is required means for outputting a signal to stop the starter motor 2 after the engine is restarted according to the third embodiment, the restart command signal is stopped upon the operating lever 16 being returned to the neutral position, and the starter motor 2 is automatically stopped according to the fourth embodiment. As a result, the system configuration can be simplified for the starter motor control.

Further, since the hydraulic lock is released subsequent to the engine restart, the operation can be started immediately. Still further, there is a time delay between the engine restart and the hydraulic unlock, there is no fear that the machine moves simultaneously to the restart of the engine 1.

As another embodiment of the present invention, there may be provided such a configuration that whether the engine is in operation or not is not specified as the condition for the hydraulic unlock.

With this configuration, even if the engine restart fails in the cold time, the hydraulic lock is released, and the actuator whose lock has already been released may be activated by mistake upon the next restart.

On the other hand, according to the fourth embodiment, since the hydraulic lock is released only if the engine 1 is in operation, the above problem never occurs.

Other Embodiments (1) Although the above respective embodiments are configured such that an open/closed state of the gate lever 12 is not specified as a condition of the engine restart, the closed state of the lever may be added as the condition for the engine restart. Namely, there is provided such a configuration that the engine 1 is not restarted upon the gate lever 12 being opened.

With this configuration, since the engine 1 will not be restarted upon the gate lever 12 being opened, even if the operator operates the restart instructing means (the restart switch 15 in the first embodiment, the proximity switches 17 in the second embodiment, and the switches 18 in the third and fourth embodiments) by mistake upon getting on/off, the engine 1 will not be restarted, resulting in an increase in safety.

(2) The engine restart control according to the above respective embodiments may not be necessary depending on preference of the operator and work conditions, and a release switch for disabling the engine restart control by the engine controller 8 may be provided in the respective embodiments.

INDUSTRIAL APPLICABILITY

According to the present invention as described above, since a restart after a engine automatic stop is carried out based upon a restart command from restart instructing means under the condition completely different from that for a hydraulic unlock, they are not carried out at the same time, which is the case of background art, thereby preventing an incident where a hydraulic actuator is activated simultaneously with the restart of the engine, resulting in an increase of reliability of the restart.

Moreover, since the restart instructing means as independent instructing means issues the restart command to an engine controller via a route different from that of an engine switch, the restart operation can be carried out only by means of the restart instructing means. Since it is only necessary for the restart instructing means to simply output the restart command of the engine, it is thus not required to go through multiple steps as of the engine switch.

Consequently, a troublesome operation is not necessary, and the engine can be restarted simply and quickly.

The invention claimed is:

1. A control device for a construction machine comprising:

an engine as a power source adapted to be started/stopped based upon an operation applied to an engine switch, a hydraulic actuator for operating upon a hydraulic pump as a driving source, hydraulic lock control means for locking said hydraulic actuator in a hydraulic lock active condition where said hydraulic actuator is in an inactive state upon a predetermined hydraulic lock condition being met and unlocking said hydraulic actuator upon a predetermined hydraulic unlock condition being met, engine control means for carrying out an automatic stop control to automatically stop said engine upon a predetermined automatic stop condition being met, restart instructing means for issuing a restart command to said engine control means via a route independently of that of the engine switch and independently of the hydraulic unlock condition, wherein said engine control means is configured to restart said engine based upon the restart command from said restart instructing means after an automatic stop of said engine by the automatic stop control, an operating member for instructing activation of said hydraulic actuator, and a restart sensor as said restart instructing means for transmitting the restart command to said engine control means upon detecting an operation applied to said operating member by an operator.

2. The control device for the construction machine according to claim 1, further comprising a plurality of hydraulic actuators including said hydraulic actuator, wherein there are provided said restart sensor on said operating member for instructing the activation of each of said hydraulic actuators, and said engine control means is configured to restart said engine upon said restart sensor issuing the restart command substantially at the same time.

3. The control device for the construction machine according to claim 1, wherein said engine control means is configured to restart said engine based upon the restart command from said restart instructing means upon said operating member being operated in a predetermined engine restart pattern.

4. The control device for the construction machine according to claim 3, wherein said engine control means is configured to restart said engine upon determining that the engine restart pattern occurs if said operating member is operated from a neutral position to a position for activating said hydraulic actuator, and then is returned to the neutral position.

5. The control device for the construction machine according to claim 3, wherein said engine control means is configured to restart said engine upon determining that the engine restart pattern occurs if said operating member being operated from a neutral position to a position for activating said hydraulic actuator.

6. The control device for the construction machine according to claim 5, wherein said hydraulic lock control means releases the hydraulic lock active condition of said hydraulic actuator upon the hydraulic unlock condition being met if said operating member is returned from the position for activating said hydraulic actuator to the neutral position.

7. The control device for the construction machine according to claim 6, further comprising engine operation detecting means for detecting that said engine is in operation, said hydraulic lock control means being configured to determine that the hydraulic unlock condition is met if said engine operation detecting means detects that the said engine is in operation.

* * * * *

UNITED STATES PATENT AND TRADEMARK OFFICE

CERTIFICATE OF CORRECTION

PATENT NO. : 7,500,535 B2
APPLICATION NO. : 10/543341
DATED : March 10, 2009
INVENTOR(S) : Yoshiki Kamon et al.

It is certified that error appears in the above-identified patent and that said Letters Patent is hereby corrected as shown below:

On the title page:
Item 56, under Foreign Patent Documents, page 2, please insert the following:

-- JP 2000-96631 04/2000
JP 2001-041069 02/2001
JP 2000-096627 04/2000
JP 5-44517 02/1993
JP 5-33366 02/1993 --

Signed and Sealed this

Eleventh Day of August, 2009

David J. Kappos
*Director of the United States Patent and Trademark Office*